(12) United States Patent
Hjartarson et al.

(10) Patent No.: US 6,295,343 B1
(45) Date of Patent: Sep. 25, 2001

(54) METHOD AND APPARATUS FOR COMBINING VOICE LINE CARD AND XDSL LINE CARD FUNCTIONS

(75) Inventors: Gudmundur "Jim" Hjartarson, Nepean; Mark Feeley, Kanata; Jonathan Boocock, Woodlawn; Andrew Deczky, Ottawa; Andreas Weirich, Stittsville, all of (CA)

(73) Assignee: Catena Networks, Inc., Redwood Shores, CA (US)

( * ) Notice: Subject to any disclaimer, the term of this patent is extended or adjusted under 35 U.S.C. 154(b) by 0 days.

(21) Appl. No.: 09/614,927

(22) Filed: Jul. 12, 2000

(30) Foreign Application Priority Data

Jul. 13, 1999 (CA) .................................................. 2277534

(51) Int. Cl.[7] .................................................. H04M 11/00

(52) U.S. Cl. .................. 379/93.05; 379/399; 379/414

(58) Field of Search ...................... 379/93.05, 93.08, 379/93.26, 93.28, 93.37, 90.01, 93.01, 399, 414

(56) References Cited

U.S. PATENT DOCUMENTS 5,889,856 * 3/1999 O'Toole et al. ..................... 379/399

* cited by examiner

Primary Examiner—Wing F. Chan
(74) Attorney, Agent, or Firm—Townsend and Townsend and Crew LLP; Kenneth R. Allen (57) ABSTRACT

An integrated line card for providing an analog termination for both POTS and xDSL signals that present the appropriate impedances at xDSL frequencies for the xDSL signals and appropriate impedances at POTS frequencies for POTS signals. The line card comprises a front end for coupling combined POTS and xDSL transceiver circuits to a telephone line at a single termination and an impedance generator responsive to the frequency range of the POTS and the xDSL circuits for generating the appropriate impedances on the line at xDSL frequencies for xDSL signals and the appropriate impedances at POTS frequencies for POTS signals, such that the signals are coupled to the card without the use of a splitter. Preferably, the xDSL circuits and the POTS circuits share a common driver for driving signals onto the loop. An advantage of this arrangement is that the two circuits may be designed together thus ensuring out-of-band noise generated by either source does not interfere with the other. In a further embodiment the generation of the frequency dependent impedance is implemented by using a feedback circuit that feeds a signal representing current sensed on the loop back into the transmit driver.

17 Claims, 10 Drawing Sheets

Prior Art DSL Central Office System

METHOD AND APPARATUS FOR COMBINING VOICE LINE CARD AND XDSL LINE CARD FUNCTIONS

BACKGROUND OF THE INVENTION

The present invention relates to the field of combined voice and data communications systems and more particularly to an integrated line card for coupling telephony and high-rate data communications functions to a two-wire telephone loop.

With the increasing popularity of the Internet, there has been a corresponding increase in the demand for high rate digital transmission over the local subscriber loops of telephone companies. A loop is typically a twisted-pair copper telephone line coupling a user or subscriber telephone to a switching station such as a central office (CO).

Conventional data communication equipment uses the voice band of the subscriber loop. Such equipment includes voice band modems, which operate at up to 56 kbps. On the other hand, Integrated Services Digital Network (ISDN) systems have enabled greater data rates over existing copper phone lines 128 kbps. However conventional voice band equipment is limited by the maximum data rate of the existing switching networks and PCM (Pulse Code Modulation) data highways.

Utilizing the frequency bandwidth of the loop outside the voiceband, other high-speed systems have evolved. However because loops can differ in distance, diameter, age and transmission characteristics depending on the network, they pose some limitations and challenges for designers.

Current high-speed digital transmission systems of the above type include asymmetric, symmetric, high-rate, and very high-rate digital subscriber loops, conventionally known as ADSL, SDSL, HDSL and VDSL respectively. Normally these and other similar protocols are known as xDSL protocols.

Figure 1A:
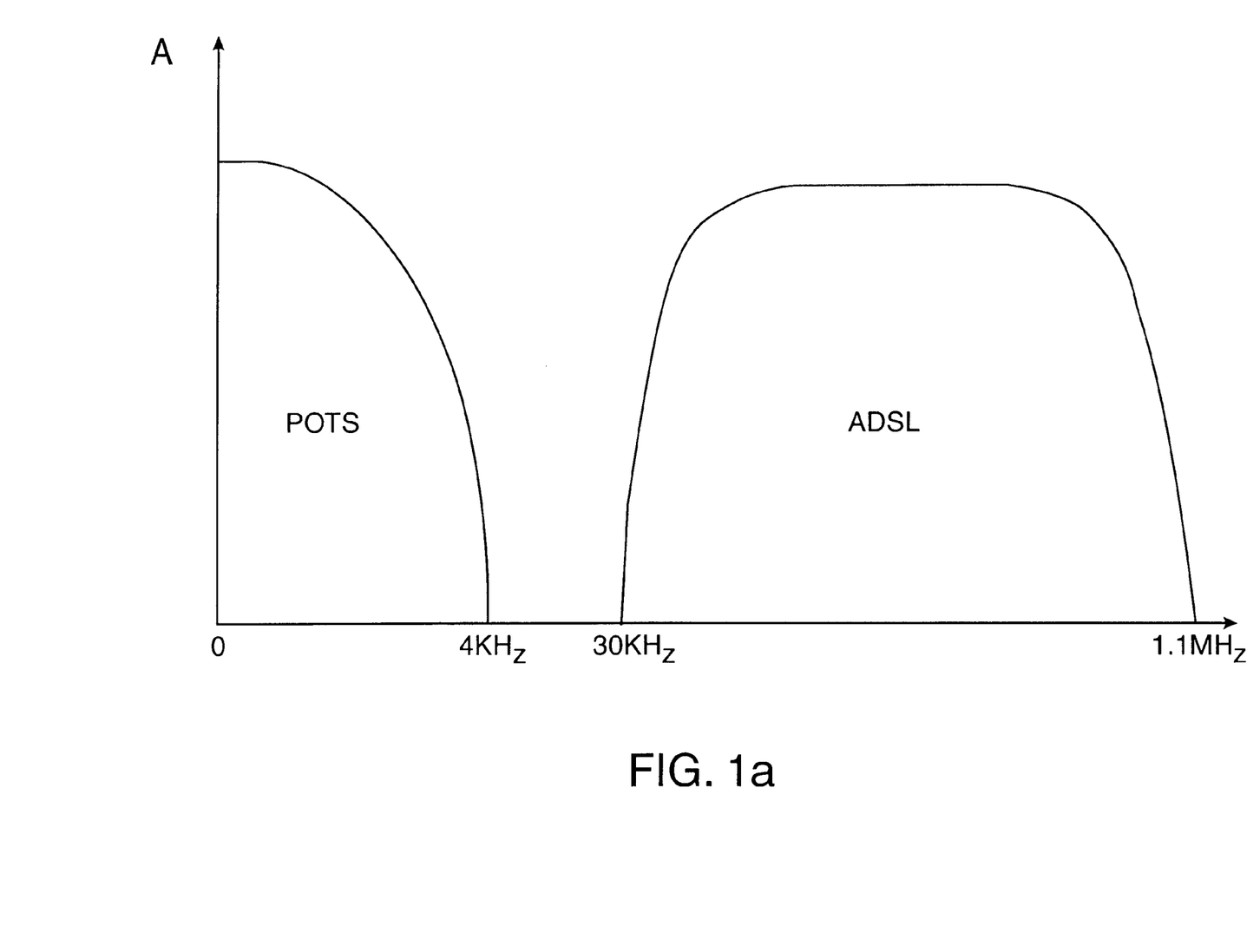
FIG. 1A is a diagram showing the frequency spectrum of an ADSL system.

Of these types of xDSL, ADSL is intended to co-exist with traditional voice services by using different frequency spectra on the loop. In the future, it is possible that multiple transmission schemes may be employed in different frequency bands on the same loop, and that these transmission schemes may include traditional analog voice services as well as current and new forms of xDSL. In known ADSL systems, the so-called "plain old telephone services" (POTS) is allocated the frequency spectrum between 0 kHz and about 4 kHz and ADSL is allocated the frequency spectrum between 30 kHz and 1.1 MHz for data over the telephone line. This is shown schematically in FIG. 1A. ADSL also partitions its frequency spectrum with upstream (subscriber to CO) transmission in a lower frequency band, typically 30 kHz to 138 kHz, and with downstream transmission in a higher frequency band, typically 138 kHz to 550 kHz or 1.1 MHz. ADSL uses a discrete multi-tone (DMT) multi-carrier technique that divides the available bandwidth into approximately 4 kHz sub-channels.

Figure 1B:
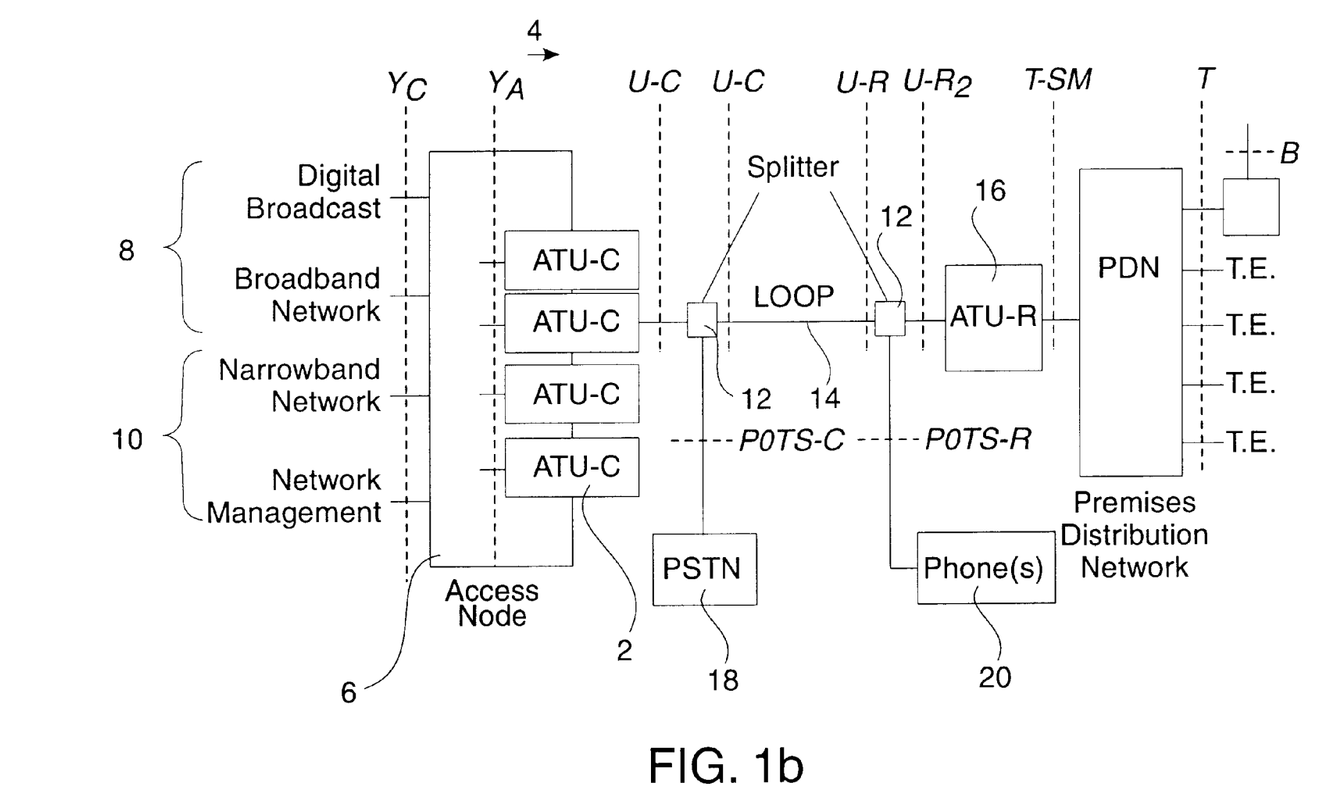
FIG. 1B is a schematic diagram of a conventional ADSL system architecture.

The architecture, interfaces and protocols for telecommunications networks incorporating ADSL modems are illustrated in FIG. 1B. The elements consist of one or more ATU-Cs 2 (ADSL transmission units or ADSL modems) at a central office end 4. The ATU-C 2 can be integrated within an access node 6, which is the concentration point for broadband data 8 and narrowband data 10. Broadband and narrowband in this context is meant telecommunications systems for data rates above 1 Mbps and telecommunications systems for data rates at or below 1 Mbps, respectively. The access node 6 can be located at a central office or at a remote site. A remote access node may also subtend from a central access node. The ATU-Cs 2 are, in conventional technology, coupled via a splitter 12 to the telephone loop 14. The loop 14 at the customer end is also coupled via a splitter 12 to an ATU-R 16 or an ADSL modem which may be integrated within an SM (Service Module), which are devices that perform terminal-adaptation functions. Examples of SMs are Set Top Boxes, PC interfaces, or LAN routers. The PSTN (Public Switched Telephone Network) 18 to the subscriber phones 20 shares the loop 14 via the splitter 12, which isolates the POTS from the ADSL modems.

Figure 2:
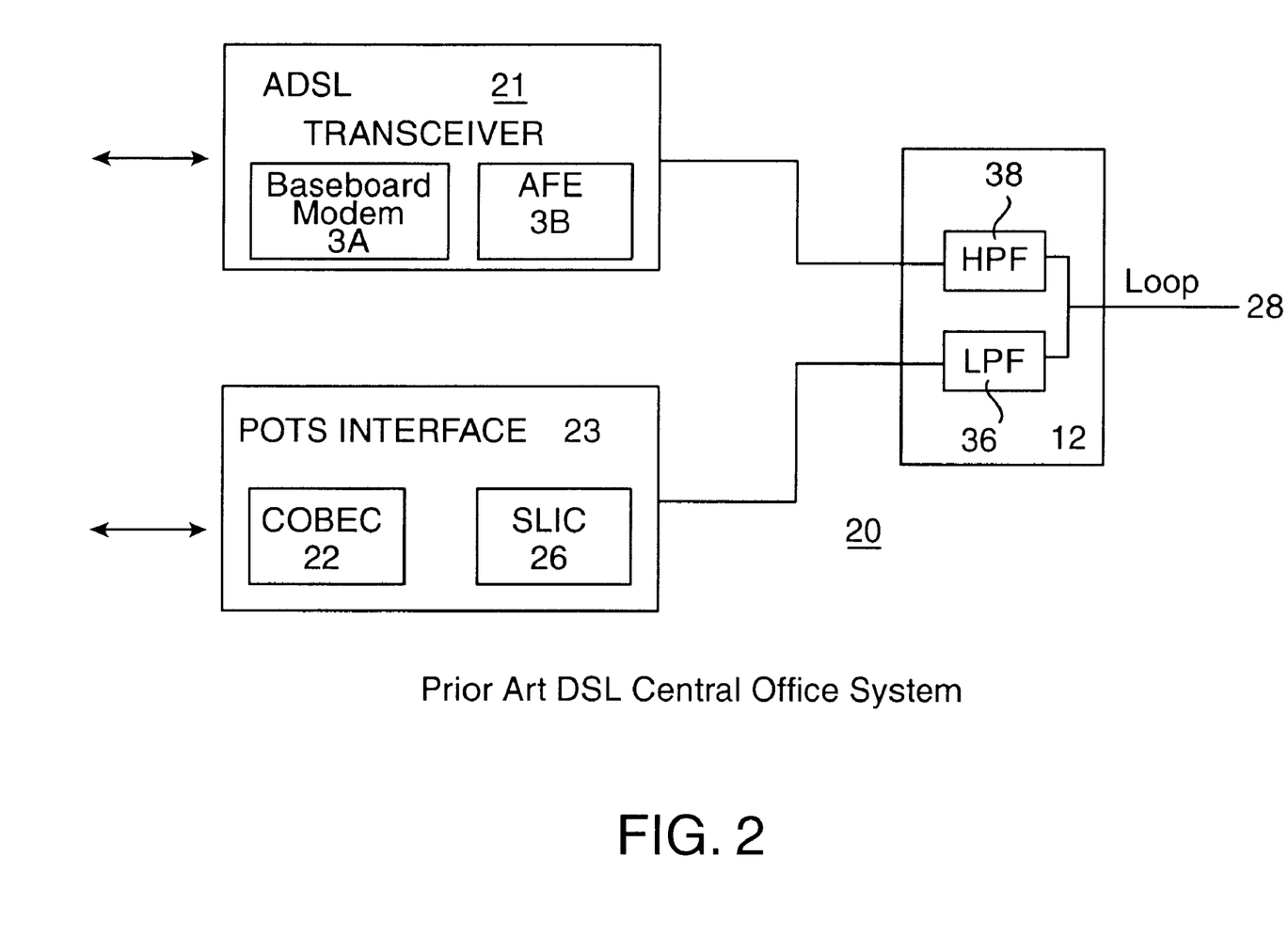
FIG. 2 is a schematic diagram of a general ADSL/POTS architecture incorporating a splitter according to the prior art.

The splitter 12, or POTS splitter, is the standard model for the deployment of xDSL services and POTS services onto the same physical copper pair 28. An analog POTS splitter 12 is shown in FIG. 2 and provides the filtering required to separate the POTS and ADSL bands on the copper pair before being input to their respective transceivers 23 and 21. The POTS splitter 12 is bi-directional and is also used to combine the POTS and ADSL bands onto the same copper pair 28. Generally, the POTS splitter 12 consists of a low pass filter (LPF) 36 inserted between the telephone interface and the loop and a high pass filter (LPF) 38 inserted between the ADSL transceiver and the loop. The LPF 36 passes the voice signals and the HPF 38 passes the xDSL signals.

It is usually assumed that the key function of the POTS splitter 12 is to separate high frequency (ADSL) and low frequency (POTS) signals at the network end and premises end to pass to their respective line cards. The actual function is more complex and deals with the need to provide the correct impedance on the line in different frequency bands in order to allow signals to properly propagate along the loop and meet the relevant specifications and standards.

In the case where separate POTS equipment and xDSL equipment are used, the low pass function of the POTS splitter serves a second function. Not only does the POTS splitter split off the voice signals to the POTS but it also eliminates any high frequency signals that may emanate from the POTS equipment (such as relay switching transients) and which would otherwise interfere with the xDSL signals. In particular, with legacy POTS equipment, these signals are more likely to be produced and therefore need to be filtered. It is desirable however to eliminate such switching transients and inband interferences without adding extra low pass or high pass filters in the signal path.

Further disadvantages of the analog splitter are bulk and expense. Thus a number of solutions have been proposed to eliminate the splitter. For example, U.S. Pat. No. 5,757,803 describes a POTS splitter assembly with an improved trans-hybrid loss for xDSL transmission. U.S. Pat. No. 5,889,856 describes a system for using a digital splitter rather than an analog splitter. In this implementation, the loop is coupled to a single analog-to-digital (A/D) converter. The waveforms from the analog phone line are converted to digital values by the A/D converter, and the digital splitter separates the low frequency POTS from the high frequency ADSL. Although this patent describes an architecture that is conceptually feasible, it is technically limited. Specifically, it is assumed that the front end of the A/D converter is able to adequately match the impedance on the loop at different frequencies in order for the xDSL and voice signals to properly propagate across the loop. Although this patent describes an attempt to eliminate the analog splitter, some form of analog filter must be implemented in its analog line interface in order to allow the A/D to work properly. These analog filter components as described earlier are rather bulky and accordingly do not achieve the desirable advantage to eliminate the splitter and its associated disadvantages.

Figure 3:
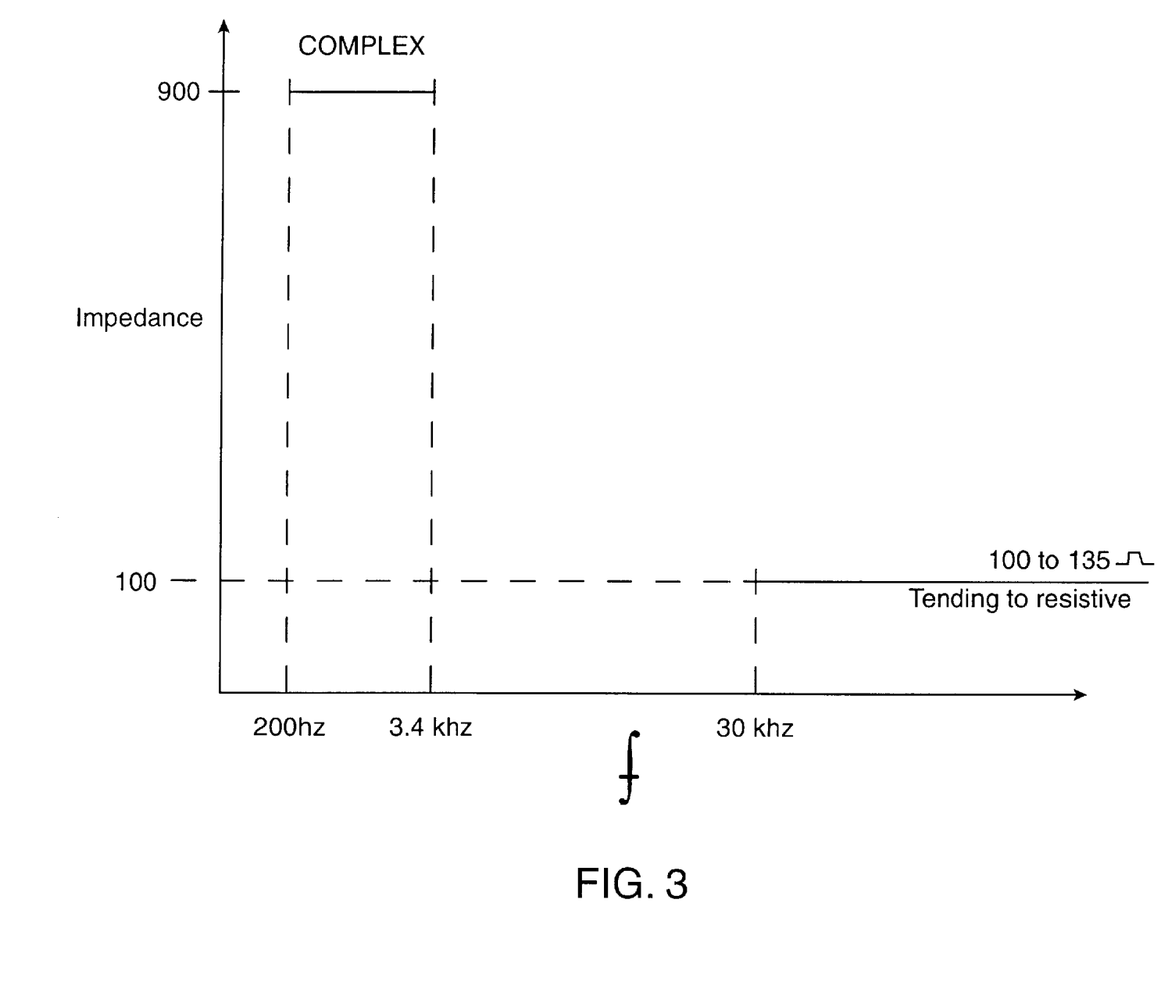
FIG. 3 is a graphical representation of the impedance characteristics of a loop.

A further problem faced by designers of integrated line cards is caused by the effect of signal frequency on the loop characteristics. Typical twisted pair loops designed for voice telephony exhibit complex impedances in the voiceband and tend to exhibit purely resistive-type characteristic impedance as the frequency of the propagating signal increases, as depicted in FIG. 3. When ADSL signals are added to a POTS loop they are typically added at frequencies well above the voice band where the loop impedance more closely approximates the resistive characteristic impedance. In the case of both the POTS signal and the xDSL signal the design goal is to generate minimal signal reflections back from the loop onto the card. This is especially true in the case of the POTS voiceband where the transmitted signal and the receive signals share the same spectrum. This is also true in the case of "echo cancelled" xDSL signals, where part of the downstream and upstream spectrums overlap.

The above is achieved in the case of separate xDSL and POTS circuitry by matching the drive and termination impedances as closely as possible to the loop impedance in the frequency band of interest. Thus when either a POTS line card or a xDSL line card is present on the loop alone, the line card (or xDSL modem) is capable of terminating the loop at the appropriate frequency dependent impedance. The POTS or xDSL card is also equipped with all the required filtering needed to eliminate out of band signals and interferences. Furthermore, no external filters such as those used in POTS splitters are needed in the single termination case.

In contrast, when both a POTS signal and a xDSL signal are bridged together without a POTS slitter on a loop, the impedance seen by the xDSL signal is the desired impedance on the loop in parallel with the impedance on the POTS line card. Similarly, the impedance seen by the POTS signal is the desired impedance on the loop in parallel with the impedance on the xDSL line card. In this case, a POTS splitter would not be required if, for example the POTS line card and the stub of cable used to bridge the card onto the loop appeared as a very high impedance compared to the loop impedance at xDSL frequencies, and conversely the xDSL line card and the stub of cable used to bridge it onto the loop appeared as very high impedance compared to the loop impedance at POTS frequencies. Furthermore, it is specified that neither the POTS line card nor the xDSL line card transmit interfering noise in either the xDSL band and the POTS band respectively. Finally, the respective analog front ends (AFEs) of the POTS line card and the xDSL line card must be guaranteed not to overload due to the signal energy of the xDSL signal and the POTS signal respectively. Further the band pass function normally present in the POTS line card should reject the out-of-band energy from the xDSL line card and similarly the high pass function normally present in the xDSL line card should reject the out-of-band energy from the POTS line card.

In practice the above conditions are difficult to meet since the impedance of legacy POTS equipment at xDSL frequencies is uncontrolled and differs with different implementations. Moreover, the length of stubs used to bridge the xDSL and POTS signals onto the loop are difficult to control and if used would add complex frequency dependant impedances. In addition, legacy POTS equipment transmit noise signals that are in the band of the xDSL signal. As a result, it is conventional wisdom that a POTS splitter is required when bridging legacy POTS line cards and new xDSL line cards onto a loop.

Accordingly, one aspect of the present invention is to mitigate some of the disadvantages associated with current integrated xDSL and POTS equipment as described above.

SUMMARY OF THE INVENTION

According to the invention, in an integrated line card, an impedance generator responsive to the frequency ranges of a POTS signal and of xDSL signal is provided for generating appropriate impedances on the line at xDSL frequencies for xDSL signals and at POTS frequencies for POTS signals. An advantage of the invention is that the conventional POTS splitter is eliminated while providing a solution to the problem of providing a combined analog termination for both POTS and xDSL signals. Specific embodiments include analog impedance generators, digital impedance generators with a single analog to digital converter, and digital impedance generators with dual analog to digital converters.

In accordance with a further embodiment of the invention, there is provided separate transmit and receive signal paths for each xDSL and POTS circuit. Furthermore, a linear summing circuit combines the xDSL transmit signal and the POTS transmit signal in the transmit direction before being driven onto the loop. Preferably, the xDSL circuits and the POTS circuits share a common driver for driving signals onto the loop. With this arrangement the two circuits may be more tightly integrated to ensure that out-of-band noise generated by either source does not interfere with the other.

In a further embodiment, the receiver section includes a simple buffer amplifier for splitting the received signals before forwarding them to their respective receiver circuits.

In a further embodiment, the generation of the frequency dependent impedance is implemented by using a feedback loop that feeds a signal proportional to the current sensed on the loop back into the transmit driver. Preferably, an appropriate low pass filter is inserted before the impedance generation block in order that the generating impedance may be made to diminish at high frequencies thus leaving the feed resistor as the termination impedance at high frequencies and the complex generated impedance as a termination impedance at low frequencies only.

In a further embodiment, the generation of the frequency dependent impedance may be done either digitally or by analog techniques.

The invention will be better understood by reference to the following detailed description in connection with the accompanying drawings.

DESCRIPTION OF SPECIFIC EMBODIMENTS

In the following description, like numerals refer to like structures in the drawings. Referring to FIG. 2, a configuration for a conventional xDSL central office system 20 is shown. The system comprises an ADSL transceiver 21 for processing digital data, a POTS splitter 24, and a POTS transceiver incorporating a SLIC (subscriber line interface circuit) 26 and a CODEC 22 for processing voice data. The POTS splitter 24 is coupled to a subscriber loop 28 and splits off the spectrum associated with the voice signal providing it to the SLIC and CODEC 22, and provides a high frequency data signal to the ADSL transceiver 21. The ADSL transceiver includes a DSL baseband circuit 31 coupled to the broadband data path, an xDSL analog front-end (AFE) 33 which is fed from the xDSL baseband circuit and couples to the splitter 24 via a loop driver. The xDSL transceiver provides bi-directional communication between the broadband data path and the loop. The digital processing circuits provide for digital signal processing functions such as modulation, echo cancellation and equalization. Typically the AFE includes both transmit and receive channels. The transmit channel consists of a digital to analog converter (D/A) coupled to the broadband data bus, transmit filters, followed by a line driver coupled through a hybrid to the splitter. The receive channel includes a receive filter coupled to the hybrid, a programmable gain amplifier driving an analog to digital converter, which in turn outputs digital signal to the digital processing unit onto the broadband data path. Both the transmit and receive channels are coupled to the splitter which is in turn coupled by a transformer (not shown) to the loop 28. As described herein in the background of the invention, there are many disadvantages with this arrangement.

Figure 4:
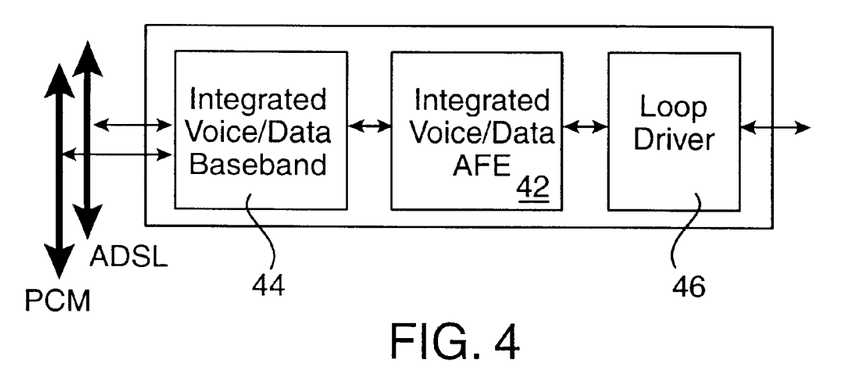
FIG. 4 is a schematic diagram of an integrated POTS/ADSL line card according to the present invention.

An embodiment of the present invention involves modification to this conventional POTS/ADSL arrangement by integrating the voice/data analog front end (AFE) 42 and the voice/data baseband 44 with a common loop driver 46 as shown schematically in FIG. 4. The integrated unit thus provides bi-directional communication between the loop and a system bus or buses carrying ADSL and PCM data. If this integrated approach is taken, the AFE 42, the baseband 44, or a combination of the two, must synthesize the frequency dependent termination in each frequency band. Further, the loop driver must provide relatively flat response over the full range of frequency bands which in integrated POTS and ADSL application would be from 200 Hz to 1.1 MHz.

Figure 5:
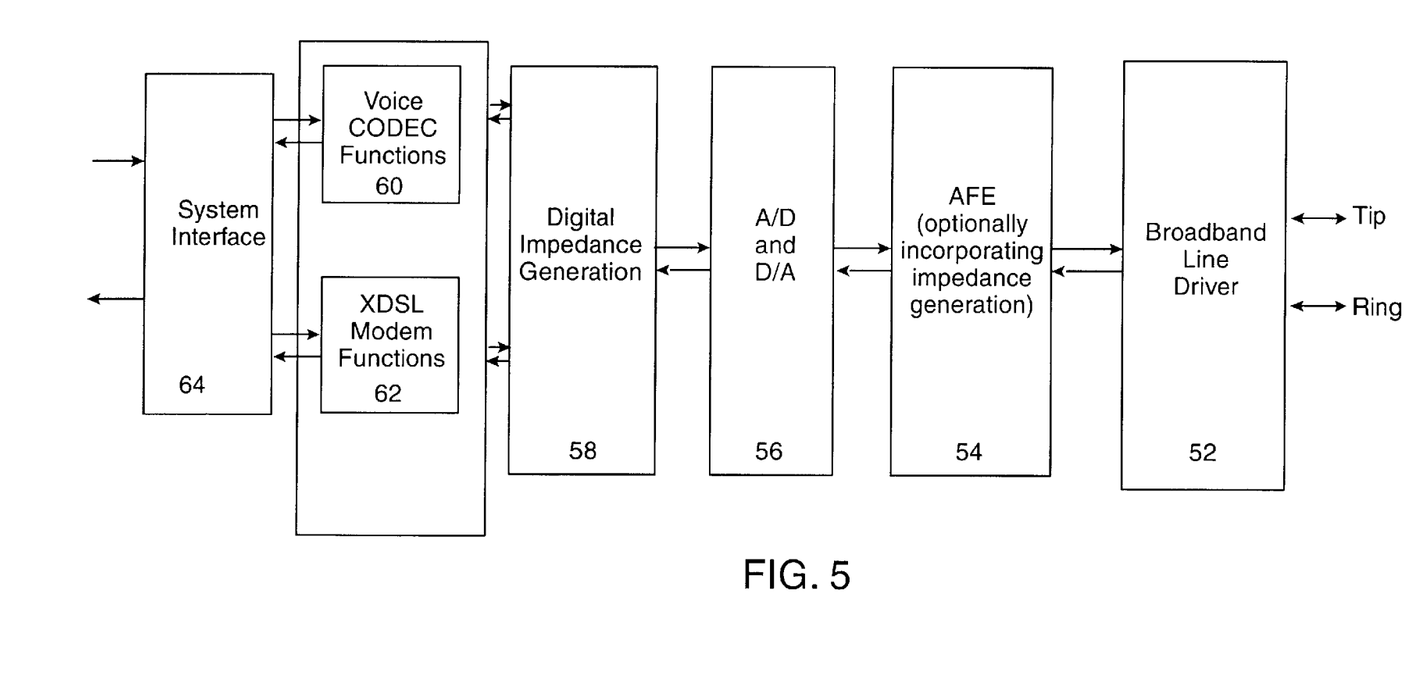
FIG. 5 is a block diagram of an integrated line interface module.

Referring to FIG. 5, a top-level block diagram of an integrated line interface module 40 of FIG. 4, for voice and data requirements according to an embodiment of the present invention is shown in greater detail. The AFE 42 includes a loop driver 52 coupled to the loop, a wide band AFE 54 possibly including impedance synthesis and coupled to the loop driver 52, and A/D and D/A converters 56. The AFE 42 thus provides bi-directional communication between the loop and the digital processing section 44 and may provide full or partial frequency dependent impedance synthesis.

The digital processing section 44 may include a digital impedance synthesis unit 58 that is coupled to the AFE 42. The unit performs either full or partial impedance synthesis required for the composite system and provides frequency dependent filtering and equalization. The composite signal is coupled to a baseband processing unit comprising one or more DSP based processing elements which implement the voice CODEC 60 and xDSL modem 62 functions. The baseband processing unit is coupled to one or more system buses carrying high speed ADSL data and PCM voice signals.

A feature of this architecture is a broadband loop drive circuit that allows the integration of the complex impedance synthesis function in highly integrated digital or analog circuit. In a preferred embodiment, the loop driver provides DC feed capability of up to 100 mA; flat or nearly flat frequency response between 200 Hz and 1.1 MHz or beyond; balanced loop drive; AC signal swing of up to 22 V peak; and low power dissipation.

Figure 6:
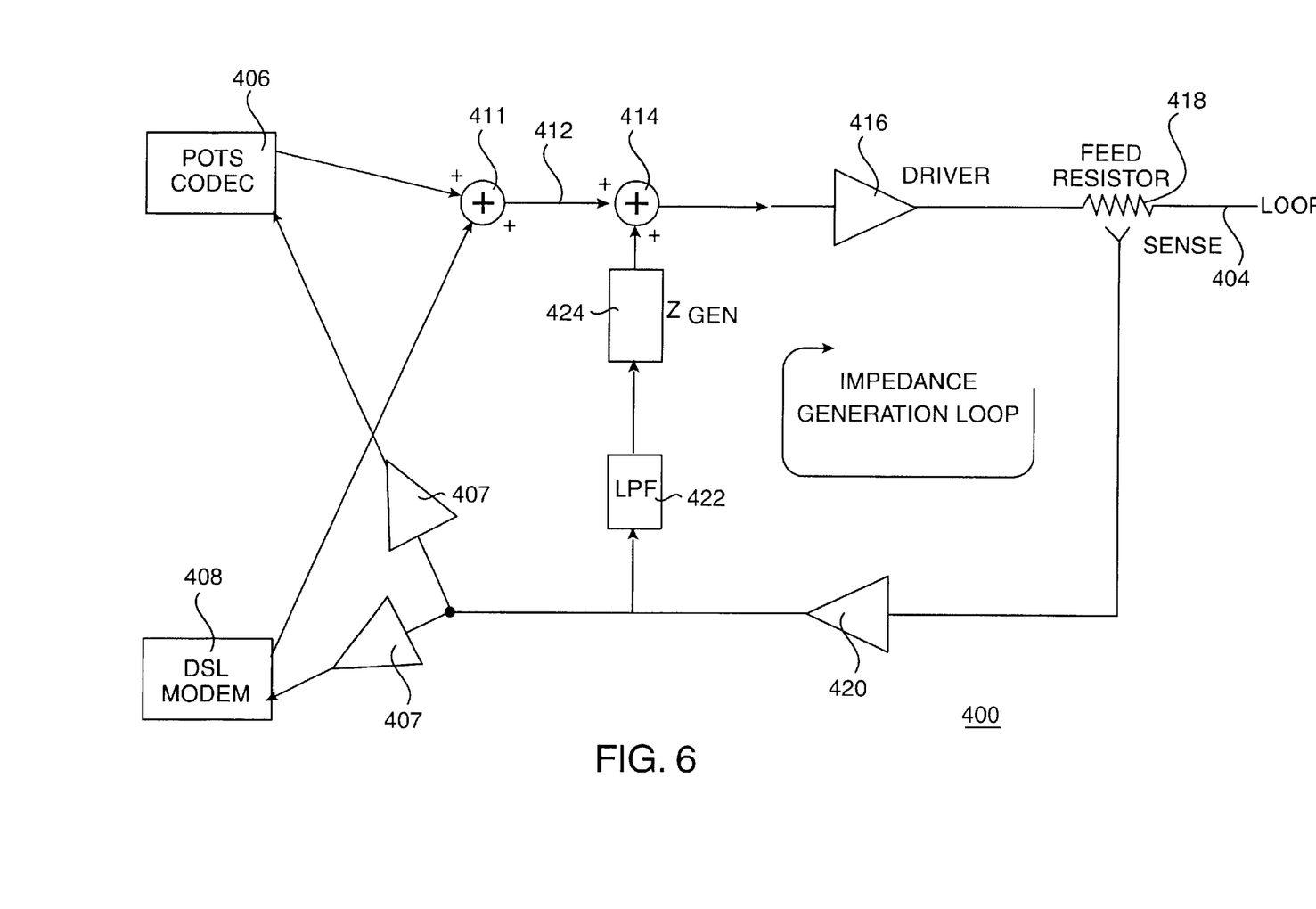
FIG. 6 is a schematic diagram of a circuit according to an embodiment of the present invention.

Referring to FIG. 6, a schematic diagram of an integrated line card for POTS and xDSL services as shown generally by numeral 400. The line card 400 includes a front end for coupling a loop 404 to a POTS line interface card (LIC) OV CODEC 406 and a xDSL modem 408. The integrated line card 400 is divided into a transmit and a receive signal path. The transmit signal path is comprised of a first adder 411 for summing the transmit signals from the POTS LIC 406 and the xDSL modem 408. The summed signal 412 is passed through a second adder 414 before being driven onto the loop 404 by driver 416.

The receive path is comprised of a feed resistor 418 for sensing the current flowing in the loop which is interfaced to a sense amplifier 420. The signal in the receive direction is coupled by a respective first and second buffer amplifier to the POTS LIC 406 and the xDSL 408 modem. The signal representing current sensed on the loop is also fed by a low pass filter 422 and an impedance generator 424 to the second adder 414.

The operation of the circuit may be explained as follows. In the transmit direction, the xDSL transmit signal and the POTS transmit signal are linearly summed before being driven onto the loop. Because the two circuits share a common driver and have been designed together, care can be taken to ensure that out of band noise generated by either source does not interfere with the other. In the receive direction the two signals are isolated by the simple buffer amplifiers 407 to send to their respective receivers.

Figure 9:
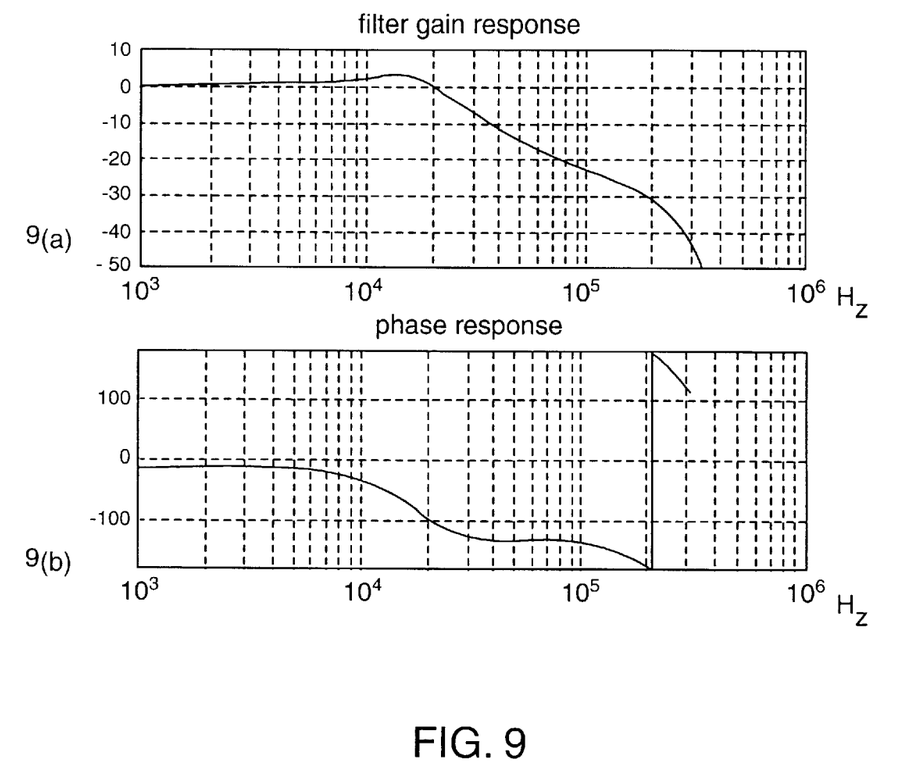
FIGS. 9A and 9B are schematic diagrams showing the gain and phase response of low pass filter for use in the present invention.

The generation of the frequency dependent impedance Zgen 426 is implemented by means of a feedback loop that feeds the signal representing current sensed on the loop back into the transmit driver 416. By putting an appropriate low pass filter 422 in front of the impedance generation block Zgen 424 the generated impedance can be made to diminish at high frequencies thus leaving the feed resistor 418 as the termination impedance of the loop at high frequencies and the complex generated impedance as the termination impedance at low frequencies. A typical filter response is shown in FIGS. 9(a) and 9(b).

The generation of the frequency dependent impedance can be done using a variety of techniques. These may be analog only or digital only. However, by generating the impedance in the digital domain, some very complex impedances and frequency responses can be more easily implemented. Furthermore impedance generation in the digital domain permits the system to be made programmable for different applications, countries and loop characteristics. One example of such an impedance generator may be implemented using standard components, such as a Digital Sisgnal Processor. For example, an AMD (Advanced Micro Devices) QSLAC (Quad Subscriber Line Audio-processing Circuit) is a programmable DSP that allows the impedance characteristics to be easily adjusted to address virtually any set of line conditions through software. These digital filters provide reliability, no drift in filter response over time or temperature, and excellent transmission performance.

Figure 7:
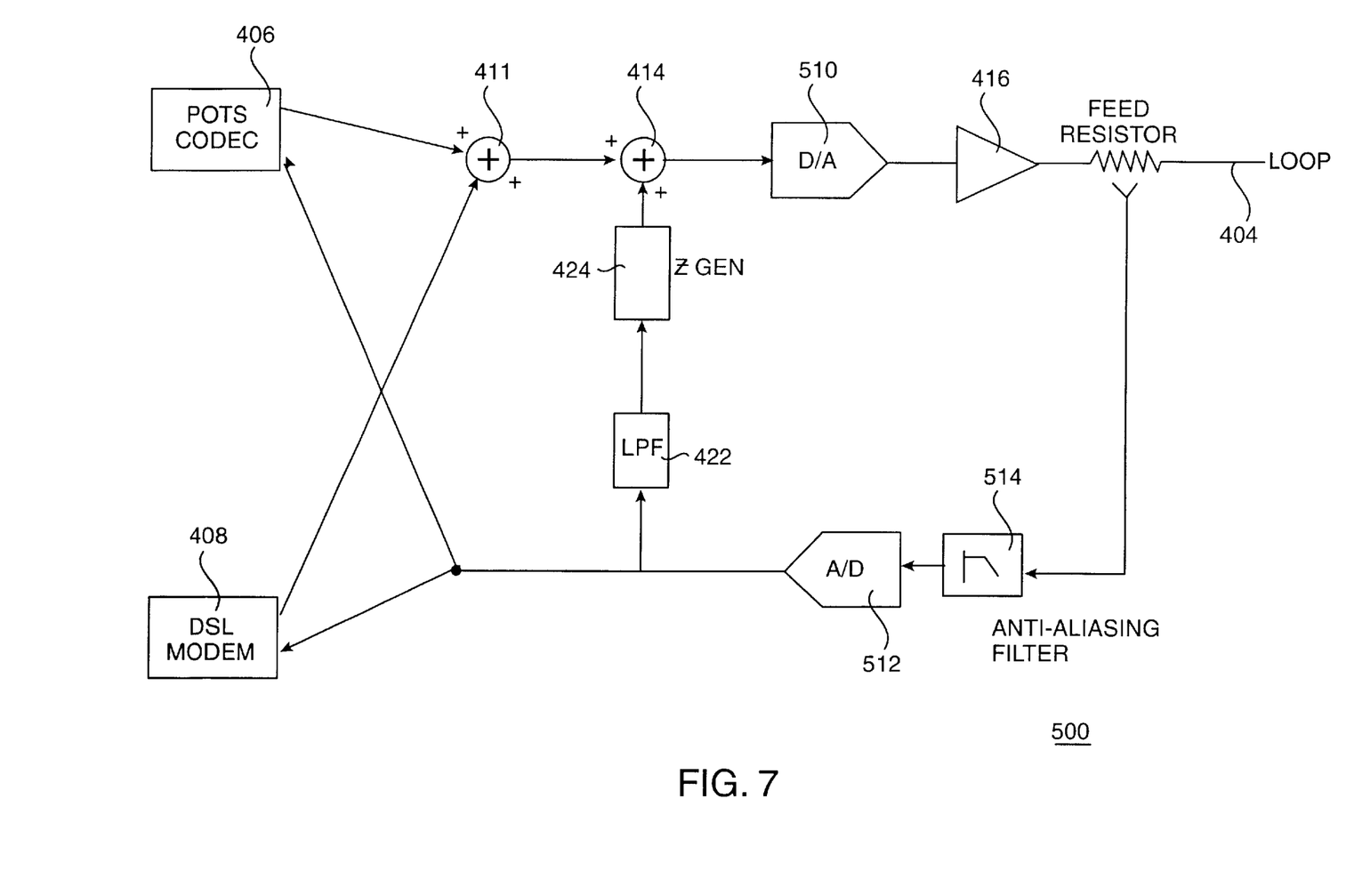
FIG. 7 is a schematic diagram of a digital implementation of the circuit in FIG. 5.

Referring now to FIG. 7, a digital implementation of the generalized circuit of FIG. 6 is shown generally by numeral 500. As may be seen, the front end is similar to that of FIG. 6; however the output from the second summer 414 is fed into a digital analog converter 510 before being driven through the driver 416 onto the loop 404.

The receive signal path includes an analog-to-digital converter 512 preceded by an anti-alias filter 514. The output from the analog-to-digital converter 512 is fed to the POTS CODEC 406 and the xDSL modem.

In this implementation the A/D 512 should be very low noise with a very high dynamic range. If this is not the case quantization and thermal noise will cause the implementation to fail to meet idle channel noise specifications for POTS band signals, which normally may have low signal levels.

Figure 8:
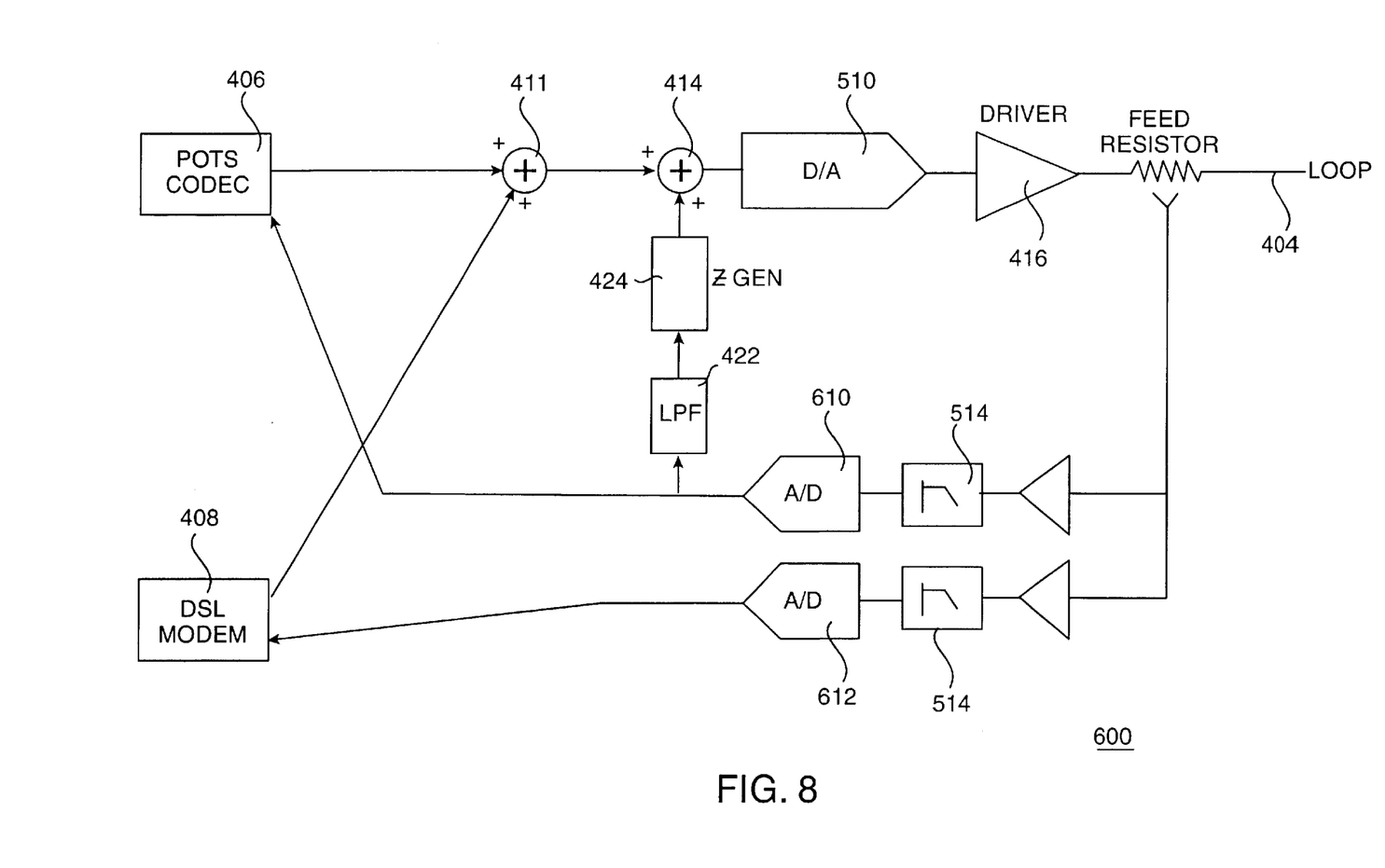
FIG. 8 is a schematic diagram of a further embodiment of the digital implementation of FIG. 6.

Referring to FIG. 8, a further digital implementation of the circuit of FIG. 7 is shown generally by numeral 600. In this implementation, a pair of A/Ds 610 and 612 are used in the receive signal path. The outputs from the respective A/Ds 610 and 612 are coupled to their respective POTS CODEC 406 and xDSL modem 408. In this case, only the output from the A/D 610 to the POTS CODEC 406 need be fed back through the impedance generator Zgen 424.

The circuit of FIG. 8 solves the problem identified in the implementation of FIG. 7 by using a second A/D 610 for the POTS signal. This converter 610 has its signal range, sampling rate, and corner frequency of the anti-aliasing filter selected to optimize the noise performance of the POTS and impedance generation path.

Since both the POTS linecard 406 and the xDSL modem 408 circuits have high-order filters as part of their input circuits, the anti-aliasing filters can be simple first order filters.

Although the invention has been described with reference to certain specific embodiments, various modifications thereof will be apparent to those skilled in the art without departing from the spirit and scope of the invention as outlined in the claims appended hereto.

What is claimed is:

1. An integrated line card for terminating a phone line, said card comprising:

(a) an input for receiving an analog signal from the line, the analog signal including a high frequency band for data transmissions and low frequency band for carrying voice calls;

(b) an xDSL modem for processing the high frequency band signals;

(c) a voice band processing circuit for processing said voice signals; and (d) a coupling circuit for coupling said analog voice band processing circuit to said xDSL modem and said Voice band processing circuit comprising an impedance generator responsive to the frequency range of said analog signal for generating appropriate impedances on said line at xDSL frequencies for xDSL signals and appropriate impedances at POTS frequencies for POTS signals such that a splitter is unneeded.

2. An integrated line card for terminating a telephone loop, said card comprising:

(a) an xDSL modem circuit;
(b) a voice band circuit; and
(c) a single termination circuit for coupling said circuits to the loop and to provide signals from said loop to said circuits comprising an impedance generator responsive to the frequency range of said analog phone signal for generating appropriate impedances on said line at xDSL frequencies for xDSL signals and appropriate impedances at POTS frequencies for POTS signals such that a splitter is unneeded.

3. An integrated line card comprising:

(a) an front end for coupling combined POTS and xDSL transceiver circuits to a telephone line, said line for carrying an analog signal, the analog signal including a high frequency band for xDSL signals and low frequency band for POTS signals; and (b) an impedance generator responsive to the frequency range of said analog signal for generating appropriate impedances on said line at xDSL frequencies for xDSL signals and appropriate impedances at POTS frequencies for POTS signals.

4. An integrated line card according to claim 3, wherein each said POTS and xDSL circuit includes separate transmit and receive signal paths.

5. An integrated line card according to claim 4, including a linear summing circuit for adding said xDSL and POTS signals received on said transmit signal path to drive said combined signals onto said telephone line.

6. An integrated line card according to claim 4, including a common drive circuit coupled to said xDSL circuits and said POTS circuits for driving the respective transmit signals onto the line.

7. An integrated line card according to claim 4, said front end including said impedance generator.

8. An integrated line card according to claim 7, said front end including a first and second buffer amplifier for splitting the received signals before forwarding them to their respective xDSL and POTS circuits.

9. An integrated line card according to claim 4, said front end including:

(a) a common drive circuit coupled to said xDSL circuits and said POTS circuits for driving the respective transmit signals onto the line; and (b) feedback circuit for feeding a signal representing current sensed on the line back to the driver.

10. An integrated line card according to claim 9, said feedback circuit including said impedance generator.

11. An integrated line card according to claim 10, said feedback circuit including a feed resistor coupled in series with said line.

12. An integrated line card according to claim 11, said feedback circuit including a low pass filter for filtering signals coupled to said impedance generator for reducing the effect of said generated impedance at high frequencies such that said feed resistor dominates as the termination impedance at high frequencies and for said generated impedance to dominate as said termination impedance at low frequencies.

13. An integrated line card according to claim 12, said impedance generator being a digital impedance generator.

14. An integrated line card according to claim 12, said impedance generator being an analog impedance generator.

15. An integrated line card according to claim 13, said impedance generator being programmable.

16. An integrated line card according to claim 14, said impedance generator being programmable.

17. In a telecommunication system, a method for providing an analog termination for both POTS and xDSL signals on a line comprising:

generating impedances responsive to the frequency range of said POTS signals which are appropriate on said line at POTS frequencies for said POTS signals; and generating impedances responsive to the frequency range of said xDSL signals which are appropriate on said line at xDSL frequencies for said xDSL signals.

* * * * *